Aug. 18, 1953 A. A. VARELA 2,649,546

SELF-PULSING OSCILLATOR

Filed Oct. 10, 1945

Inventor

ARTHUR A. VARELA

By [signature]

Attorney

Patented Aug. 18, 1953 2,649,546

UNITED STATES PATENT OFFICE 2,649,546

SELF-PULSING OSCILLATOR

Arthur A. Varela, Washington, D. C.

Application October 10, 1945, Serial No. 621,634

5 Claims. (Cl. 250—36)

Figure 1:
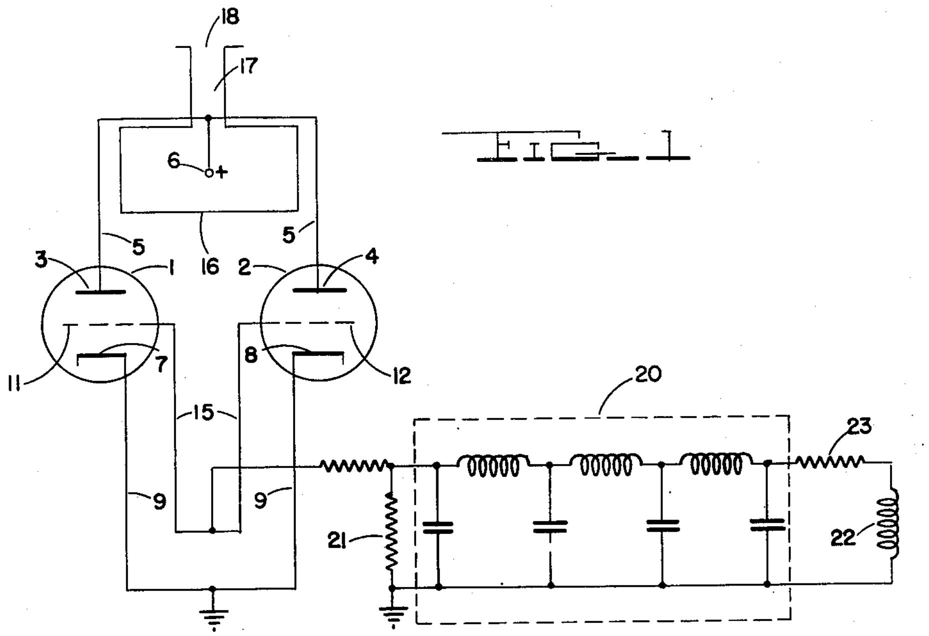

(Granted under Title 35, U. S. Code (1952), sec. 266)

This invention relates to impulse generators supplying discrete wave trains at regularly recurring intervals, and is particularly directed to the problem of stabilizing the pulse interval in such devices.

Pulse generators of the type described comprise vacuum tube oscillators passing direct current components during the pulse interval. The invention provides circuit elements excited by these components to establish the pulse repetition rate. Preferably a resonant circuit is shock excited to afford, after a proper interval, a control voltage of appropriate polarity to rekey the generator. The rekeying network may include components which also function to define the pulse duration.

It is accordingly an object of the invention to supply a self pulsing oscillator operating with a stable pulse interval.

The invention will be further described in connection with the exemplary embodiment disclosed in the drawings, in which:

Fig. 1 shows in schematic diagram one embodiment of the invention, and

Figure 2:
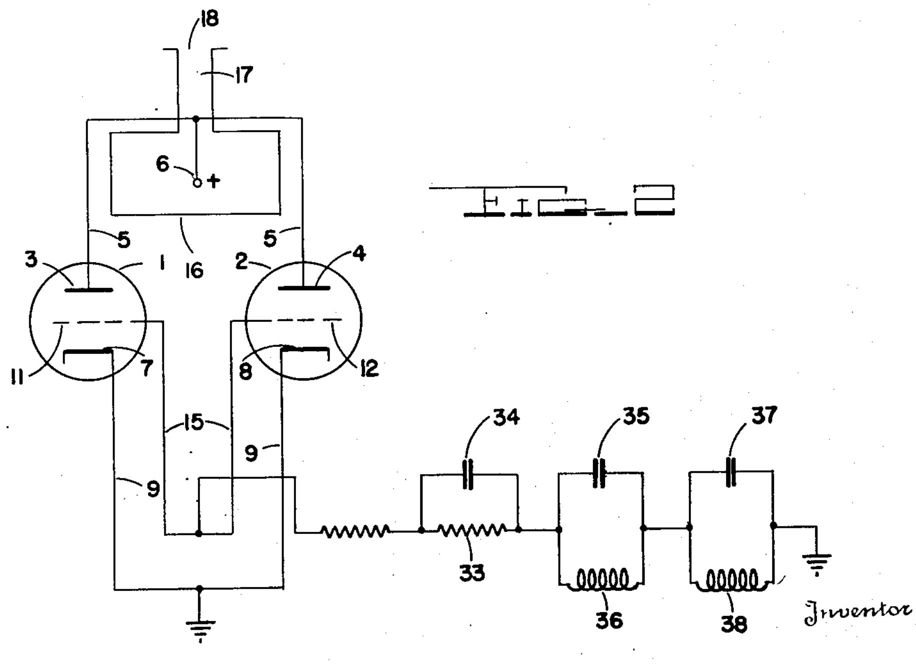

Fig. 2 discloses in schematic diagram a second embodiment of the invention.

The pulse generator of Fig. 1 may be employed in radio pulse communication circuits such as for radio echo ranging. Accordingly, a high frequency oscillator is shown comprising triode vacuum tubes 1 and 2. This is a balanced type line oscillator, anodes 3 and 4 being connected to the output tank circuit 5 and receiving a positive potential from source 6. The cathode elements 7 and 8 are returned to ground through tank circuit 9. The grids 11 and 12 are provided with tank circuit 15 which is also returned to ground.

Output power from the oscillator may be conveniently obtained from the plate tank circuit 5 through coupling loop 16 which feeds transmission line 17 for driving a load such as dipole antenna 18.

Oscillation of the impulse generator of Fig. 1 is controlled through components operating responsively to the direct current component passed by the oscillator itself, these components being included in the grid-cathode circuit and thereby setting up grid-cathode control voltages.

In Fig. 1 the control network is in the grid return circuit, and comprises an artificial line section 20 which additionally operates to define the pulse duration period. This network functions to terminate oscillation of the oscillator after a running period by applying a blocking potential to the control electrode with relation to the cathode potential. In the circuit shown, this is done by terminating the artificial line in an impedance higher than its characteristic impedance, so that the voltage reflected from the end of the line is of the same polarity as the applied voltage. It is therefore apparent that oscillation of the circuit causes a flow of grid current developing a negative potential across the upper end of grid resistor 21, this signal being propagated down line 20 to its other end and being reflected in the same polarity to develop, after the propagation period down the line and back, an increased negative potential across resistor 21 of substantially twice the initial value. This results in establishing a grid-cathode potential within the oscillator circuit which blocks the same and terminates the impulse generation to define the end of the discrete wave train.

At the end of the pulse the shunt capacity of artificial line section 20 is charged to its maximum potential, the upper side of the line being at a negative voltage. This shunt capacity is employed in connection with further components of the control network to effect rekeying of the oscillator after the desired pulse interval. To this end the line terminating impedance comprises an inductance 22. After termination of oscillation, the shunt capacity discharges through the inductance to set up a decreasingly negative potential at the upper side of the line across resistor 21. The rate of rise in this control potential is determined by the resonant circuit parameter values and may be selected as desired according to the value of inductance 22.

In radio echo ranging, for instance, the oscillation period may be of the order of five microseconds, and the pulse spacing interval of the order of 1/500 of a second. The grid-cathode control voltage at which the oscillator rekeys will, of course, depend upon the vacuum tube characteristics and upon the static oscillating potentials supplied thereto. Normally, however, the oscillator will rekey after a period approximating a quarter cycle of the resonant frequency determined by inductance 22 in conjunction with the shunt capacity. Accordingly, the inductance supplied may be designed in the supposed instance to resonate at about 125 cycles.

As soon as the oscillator rekeys to generate the succeeding impulse, the cycle of operation repeats.

In the instances where the energy of the charge in the line at the end of the pulse is not sufficiently dissipated through resistance 21 and the inherent resistance of inductor 22, a further resistance 23 may be placed in series with the latter. Inasmuch as it is not normally necessary with conventional components to drive the controlled grids positive of the cathodes to effect rekeying, the resonant control circuit may be very considerably damped, to a point even extending beyond critical damping. The function of the terminating inductance is primarily to control the rate of which the voltage of the upper part of the line recovers toward the rekeying potential.

In the circuit of Fig. 2, the rekeying resonant network which supplies the control voltage is not a part of the pulse duration control circuit. The oscillator shown comprising tubes 1 and 2, is similar to that of Fig. 1 with the exception of the grid-cathode circuit. The components similar to those in Fig. 1 have the same reference numerals.

In the circuit of Fig. 2 the pulse duration period is determined by the resistance capacity network comprising resistor 33 and condenser 34. The grid bias built up on condenser 34 during oscillation is sufficient after the desired time interval to block further operation. After the oscillator is blocked, it remains quiescent until the grid-cathode control voltage reaches a value to permit renewed operation. In view of the fact that the relatively long pulse spacing interval requires the rekeying control voltage to be near the end of the discharge time of condenser 34 through resistor 33, the low slope of this voltage with regard to time at that point renders the time of rekeying uncertain.

As will be understood, this, of course, is due to the presence of thermal and other variational voltages present within the oscillator circuit.

According to the invention, the pulse spacing interval is stabilized through the oscillation of resonant networks setting up a grid-cathode rekeying control voltage. In the circuit of Fig. 2, this network is placed in the grid return circuit.

As in Fig. 1, the control network includes a capacitative element shown as condenser 35 which is shunted by an inductive component 36. As in the case of the circuit of Fig. 1, the resonant network of Fig. 2 is excited by the direct current component passed by the tubes during the pulse duration interval and after the pulse extinction is operative to supply a voltage changing with time at a rate determined by the network resonant frequency. Thus, the grid-cathode control voltage may be caused to reach the desired rekeying potential after the desired time delay through selection of the resonant circuit parameters. This rekeying potential is preferably selected to lie on a sharply rising wave front so that the pulse spacing interval is not subject to the random disturbances encountered in the delay obtained through the discharge of the resistance capacity network previously referred to.

If it is desired to obtain a higher precision in the pulse interval spacing, more than one resonant network may be employed, to supply higher frequency voltage components containing sharper wave fronts. In this way, the main pulse interval may be determined by the lowest frequency resonance network, but the critical keying voltage may be reached on a complex wave form at a point where the rate of voltage change is additively determined by the lower frequency and higher frequency voltages superimposed thereupon. In the circuit of Fig. 2, one additional resonant network is provided, being shown as condenser 37 and inductance 38. This network may have a higher resonant frequency such as the second harmonic of the network comprising condenser 35 and inductance 36. Thus, for instance, if the operating potential supplied to the oscillator network causes it to rekey as the control voltage developed by the fundamental frequency network 35—36 passes zero voltage in a positive direction, the control voltage will carry superimposed thereupon the output of network 37—38, which will be passing also through zero at a rapid rate in a positive direction to provide a very sharp total control voltage wave front effecting high time precision rekeying of the oscillator network.

It will be understood, therefore, that through the invention a stable pulse interval duration may be obtained without the necessity of supplying auxiliary voltage supply mechanism for injecting the rekeying signal.

The embodiments shown and described are exemplary only of the invention and the scope thereof may be ascertained with reference to the appended claims.

The invention described herein may be manufactured and used by or for the Government of the United States of America for governmental purposes without the payment of any royalty thereon or therefor.

What is claimed:

1. In an oscillator supplying recurrent discrete wave trains a vacuum tube having cathode, anode, and control electrode, an artificial line section comprising series inductance and parallel capacitance connected at one end thereof between the cathode and control electrodes, and impedance means shunting the other end of the line with an impedance greater than the characteristic impedance thereof, whereby on oscillation a blocking potential is reflected to one end of the line to terminate operation of the oscillator, said impedance means comprising an inductive reactance resonating with the total parallel line capacitance at a frequency harmonically related to the recurrence frequency to establish the pulse interval.

2. In an oscillator supplying recurrent discrete wave trains a vacuum tube having cathode, anode, and control electrode, an artificial line section comprising series inductance and parallel capacitance connected at one end thereof between the cathode and control electrodes, and impedance means shunting the other end of the line with an impedance greater than the characteristic impedance thereof, whereby on oscillation a blocking potential is reflected to one end of the line to terminate operation of the oscillator, said impedance means comprising an inductive reactance resonating with the total parallel line capacitance at a frequency harmonically related to the recurrence frequency to establish the pulse interval and in series therewith a damping resistance.

3. In an oscillator supplying recurrent discrete wave trains a vacuum tube having cathode, anode, and control electrode, conductive impedance means connected between the cathode and control electrode comprising series capacity means operative to receive a charge through said tube on oscillation thereof, and second impedance means connected across the first impedance means comprising an inductance resonating therewith at a frequency harmonically related to the recurrence frequency to establish the pulse interval.

4. In an oscillator supplying recurrent discrete wave trains a vacuum tube having a cathode, anode, and control electrode, impedance means connected between the control electrode and cathode comprising a first inductance-capacity circuit operative responsively to current flow during oscillation to supply a grid-cathode control voltage component approaching a predetermined keying voltage after a time delay interval corresponding to the recurrence period and a second inductance-capacity circuit operative responsively to current flow during oscillation to supply another grid-cathode control voltage component effecting application of the predetermined keying voltage along a steeper wave front than that produced by the first inductance-capacity circuit, whereby oscillation is re-initiated after the pulse interval.

5. In a vacuum tube oscillator supplying recurrent discrete wave trains, series capacity means connected to the tube and receiving current therefrom only during wave train generation, and inductance means connected across the capacity means, said inductance-capacity circuit having a natural frequency harmonically related to the wave train recurrence frequency.

ARTHUR A. VARELA.

References Cited in the file of this patent

UNITED STATES PATENTS

| Number | Name | Date |
|---|---|---|
| 2,217,957 | Lewis | Oct. 15, 1940 |
| 2,389,004 | Schroeder | Nov. 13, 1945 |
| 2,405,552 | Blumlein et al. | Aug. 13, 1946 |
| 2,406,871 | Varela | Sept. 3, 1946 |